United States Patent
Choi et al.

(10) Patent No.: US 10,825,614 B2
(45) Date of Patent: Nov. 3, 2020

(54) ENERGY HARVESTING DEVICE USING ELECTROACTIVE POLYMER NANOCOMPOSITES

(71) Applicants: Samsung Electronics Co., Ltd., Suwon-si (KR); The Penn State Research Foundation, University Park, PA (US)

(72) Inventors: Kyounghwan Choi, Suwon-si (KR); Qiming Zhang, University Park, PA (US); Yue Zhou, University Park, PA (US); Qing Wang, University Park, PA (US); Qi Li, University Park, PA (US)

(73) Assignees: SAMSUNG ELECTRONICS CO., LTD., Gyeonggi-Do (KR); THE PENN STATE RESEARCH FOUNDATION, University Park, PA (US)

( * ) Notice: Subject to any disclaimer, the term of this patent is extended or adjusted under 35 U.S.C. 154(b) by 388 days.

(21) Appl. No.: 15/374,308

(22) Filed: Dec. 9, 2016

(65) Prior Publication Data
US 2017/0179853 A1 Jun. 22, 2017

Related U.S. Application Data

(60) Provisional application No. 62/268,911, filed on Dec. 17, 2015.

(51) Int. Cl.
*H02N 3/00* (2006.01)
*H01G 11/26* (2013.01)
(Continued)

(52) U.S. Cl.
CPC ............ *H01G 11/48* (2013.01); *H01G 11/12* (2013.01); *H01G 11/26* (2013.01); *H01G 11/36* (2013.01);
(Continued)

(58) Field of Classification Search
CPC .......... H02N 1/00; H02N 1/002; H02N 1/004; H02N 1/006; H02N 1/008; H02N 1/08;
(Continued)

(56) References Cited

U.S. PATENT DOCUMENTS 7,824,806 B2 11/2010 Visco et al.
7,972,537 B2 7/2011 Meng et al.
(Continued)

OTHER PUBLICATIONS

Giacomello et al., "Underwater energy harvesting from a heavy flag hosting ionic polymer metal composites", Journal of Applied Physics, 109, 2011, pp. 084903-1-084903-10.
(Continued)

*Primary Examiner* — Shawki S Ismail
*Assistant Examiner* — Monica Mata
(74) *Attorney, Agent, or Firm* — Cantor Colburn LLP

(57) ABSTRACT

An energy harvesting device includes: a first nanoporous electrode and a second nanoporous electrode, each of which is configured to which store electrical charge; a first current collector connected to the first nanoporous electrode and a second current collector connected to the second nanoporous electrode; and an enclosure that contains the first and second nanoporous electrodes and the first and second current collectors and transfers a force applied from the outside to the first nanoporous electrode and the second nanoporous electrode, wherein at least one of the first nanoporous electrode and the second nanoporous electrode comprises an ion conductive polymer.

18 Claims, 6 Drawing Sheets

(51) Int. Cl.
*H01G 11/32* (2013.01)
*H01G 11/48* (2013.01)
*H01G 11/52* (2013.01)
*H01G 11/58* (2013.01)
*H01G 11/66* (2013.01)
*H01G 11/74* (2013.01)
*H02N 1/08* (2006.01)
*H01G 11/38* (2013.01)
*H01G 11/36* (2013.01)
*H01G 11/70* (2013.01)
*H01G 11/12* (2013.01)
*H01G 11/28* (2013.01)

(52) U.S. Cl.
CPC ............. *H01G 11/38* (2013.01); *H01G 11/70* (2013.01); *H02N 1/08* (2013.01); *H01G 11/28* (2013.01); *H01G 11/52* (2013.01); *H01G 11/58* (2013.01); *Y02E 60/13* (2013.01)

(58) Field of Classification Search
CPC ........ H01G 11/12; H01G 11/26; H01G 11/36; H01G 11/38; H01G 11/48; H01G 11/70; H01G 11/28; H01G 11/52; H01G 11/58; Y02E 60/13
USPC .......................................................... 310/308
See application file for complete search history.

(56) References Cited

U.S. PATENT DOCUMENTS

| | | | |
|---|---|---|---|
| 9,013,092 B2 | 4/2015 | Mahapatra et al. | |
| 2008/0220330 A1* | 9/2008 | Hosaka | H01M 4/0404 429/209 |
| 2009/0303660 A1* | 12/2009 | Nair | H01G 11/46 361/502 |
| 2010/0190047 A1* | 7/2010 | West | H01M 2/08 429/156 |
| 2011/0051316 A1* | 3/2011 | Liu | B82Y 30/00 361/502 |
| 2014/0099528 A1* | 4/2014 | Lockett | H01M 4/06 429/124 |
| 2014/0292952 A1 | 10/2014 | Uchiyama | |
| 2014/0335392 A1 | 11/2014 | Visco et al. | |
| 2014/0342192 A1* | 11/2014 | Wang | H01M 4/505 429/7 |
| 2014/0373920 A1* | 12/2014 | Stein | H01G 9/2018 136/263 |
| 2016/0064155 A1* | 3/2016 | Jiang | H01G 11/82 361/502 |

OTHER PUBLICATIONS

Mitcheson et al., "Energy Harvesting From Human and Machine Motion for Wireless Electronic Devices", Proceedings of the IEEE, vol. 96, No. 9, 2008, pp. 1457-1486.

\* cited by examiner

ENERGY HARVESTING DEVICE USING ELECTROACTIVE POLYMER NANOCOMPOSITES

CROSS-REFERENCE TO RELATED APPLICATION

This application claims the benefit of and priority to U.S. Provisional Patent Application No. 62/268,911, filed on Dec. 17, 2015, the content of which is incorporated herein in its entirety by reference.

BACKGROUND

1. Field

The present disclosure relates to an energy harvesting device using an electroactive polymer nanocomposite.

2. Description of the Related Art

An increase in the use of portable electronic devices has recently increased demand for a power source that may extend an operation lifespan of a battery or replace the battery. Energy harvesting from a mechanical source, such as movement of a human, has especially been on the spotlight as one of the methods that may meet this demand. In recent years, methods based on piezoelectric, electromagnetic, or ionic and variable electrostatic capacitance have been intensely studied as energy harvesting methods. Also, various studies on a flexible material or a ceramic material to be used as a material of a device for energy harvesting have been conducted.

However, low energy and power output due to low electrical and mechanical energy density of a material being used in an energy harvesting device has limited commercialization of a technology using the energy harvesting device, and thus studies from a perspective of various structures and materials to overcome the limitation have been conducted. Thus the remains a need for an improved energy harvesting device.

SUMMARY

Provided is an energy harvesting device that provides power to a mobile device and thus may extend a lifespan of a battery or be an alternative to the battery.

Additional aspects will be set forth in part in the description which follows and, in part, will be apparent from the description, or may be learned by practice of the presented exemplary embodiments.

According to an aspect of an exemplary embodiment, an energy harvesting device includes, a first nanoporous electrode and a second nanoporous electrode each of which is configured to store electrical charge; a first current collector connected to the first nanoporous electrode and a second current collector connected to the second nanoporous electrode; and an enclosure that contains the first and second nanoporous electrodes and the first and second current collectors and is configured to transfer an applied force to the first nanoporous electrode and the second nanoporous electrode, wherein at least one of the first nanoporous electrode and the second nanoporous electrode comprises an ion conductive polymer.

The enclosure may include a first metal plate connected to the first current collector; a second metal plate connected to the second current collector; and a cylinder that is configured to surround the first nanoporous electrode, the second nanoporous electrode, the first current collector, and the second current collector.

The first metal plate and the second metal plate may transfer the force to the first nanoporous electrode and the second nanoporous electrode.

A capacitance of the first nanoporous electrode and the second nanoporous electrode may change as the force contracts and expands the first nanoporous electrode and the second nanoporous electrode.

At least one of the first nanoporous electrode and the second nanoporous electrode may include a carbon material.

The carbon material may include graphene, carbon nanotubes (CNTs), activated carbon, carbon aerogel, or a combination thereof.

The ion conductive polymer material comprises polytetrafluoroethylene (PTFE), Nafion, poly(vinylidene fluoridechlorotrifluoroethylene) (P(VDF-CTFE)), poly(vinylidene fluoride-trifluoroethylene-chlorofluoroethylene) (P(VDF-TrFE-CFE)), poly(3,4-ethylenedioxythiophene) (PEDOT), polyaniline, polypyrrole, or a combination thereof.

A content of the carbon material may be in a range of about 30 weight percent to about 95 weight percent, based on a total weight of the nanoporous electrode.

The energy harvesting device may further include a separation layer that separates the first nanoporous electrode and the second nanoporous electrode.

The first nanoporous electrode and the second nanoporous electrode may include an electrolyte.

The electrolyte may include an aqueous solution, an organic electrolyte, an ionic liquid, or a combination thereof.

According to an aspect of another exemplary embodiment, an energy harvesting device includes: a p-type nanoporous electrode that provides mobile cations and an n-type nanoporous electrode that provides mobile anions; a first current collector that is connected to the p-type nanoporous electrode and a second current collector that is connected to the n-type nanoporous electrode; and an enclosure that contains the p-type and n-type nanoporous electrodes and the first and second current collectors and is configured to transfer an applied force to the p-type nanoporous electrode and the n-type nanoporous electrode.

The enclosure may include a first metal plate that is connected to the first current collector; a second metal plate that is connected to the second current collector; and a cylinder that is configured to surround the p-type nanoporous electrode, the n-type nanoporous electrode, the first current collector, and the second current collector.

The first metal plate and the second metal plate may transfer the force to the p-type nanoporous electrode and the n-type nanoporous electrode.

A width of a space charge region of the p-type nanoporous electrode and the n-type nanoporous electrode may change as the force contracts or expands the p-type nanoporous electrode and the n-type nanoporous electrode.

The p-type nanoporous electrode may include Nafion, sulfonated poly(ether ether ketone) (SPEEK), sulfonated poly(arylene ether ketone ketone sulfone) (SPAEKKS), sulfonated poly(aryl ether ketone) (SPAEK), poly[bis(benzimidazobenzisoquinolinones)] (SPBIBI), poly(styrene sulfonic acid) (PSS), sodium 9,10-diphenylanthracene-2-sulfonate (DPAS$^-$Na$^+$), or a combination thereof.

The p-type nanoporous electrode may include carbon nanotubes (CNTs) and agarose.

The n-type nanoporous electrode may include poly(diallyl dimethylammonium chloride) (PDAC), quaternary ammonium polysulphone (QAPS), tris(2,4,6-trimethoxyphenyl) polysulfone methylene quaternary phosphonium hydroxide (TPQPOH), quaternized PVA (QAPVA), quaternized poly (ether imide) (QPEI), $[Ru(bpy)_3]^{2+}$ $(PF_6^-)_2$, or a combination thereof.

The n-type nanoporous electrode may include carbon nanotubes (CNTs) and agarose.

According to an aspect of another exemplary embodiment, an energy harvesting device includes: a first energy harvesting unit that includes: a first p-type nanoporous electrode that provides mobile cations; a first n-type nanoporous electrode that provides mobile anions; and a first separation layer that separates the first p-type nanoporous electrode and the first n-type nanoporous electrode; a second energy harvesting unit that includes: a second p-type nanoporous electrode that provides mobile cations; a second n-type nanoporous electrode that provides mobile anions; and a second separation layer that separates the second p-type nanoporous electrode and the second n-type nanoporous electrode; a first current collector that is connected to the first p-type nanoporous electrode and the second p-type nanoporous electrode; and a second current collector that is connected to the first n-type nanoporous electrode and the second p-type nanoporous electrode, wherein the first energy harvesting unit is disposed on the second energy harvesting unit, and wherein the first n-type nanoporous electrode of the first energy harvesting unit is proximate the second p-type nanoporous electrode of the second energy harvesting unit.

The energy harvesting device may further include an ion blocking layer between the first energy harvesting unit and the second energy harvesting unit.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
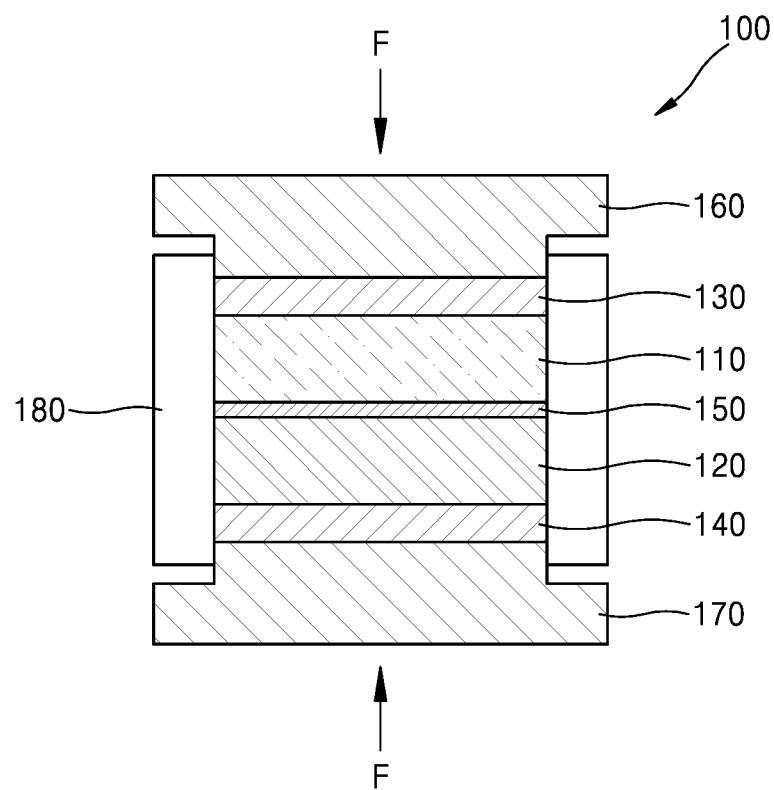
FIG. 1 is a cross-sectional view of an energy harvesting device according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a cross-sectional view of an energy harvesting device 100 according to an embodiment.

Referring to FIG. 1, the energy harvesting device 100 includes a first nanoporous electrode 110, a second nanoporous electrode 120, a first current collector 130, a second current collector 140, a separation layer 150, a first metal plate 160, a second metal plate 170, and a cylinder 180.

The first nanoporous electrode 110 and the second nanoporous electrode 120 may include an ion conductive polymer material. The ion conductive polymer material may include polytetrafluoroethylene (PTFE), Nafion, poly(vinylidene fluoridechlorotrifluoroethylene) (P(VDF-CTFE)), poly(vinylidene fluoride-trifluoroethylene-chlorofluoroethylene) (P(VDF-TrFE-CFE)), poly(3,4-ethylenedioxythiophene) (PEDOT), polyaniline, polypyrrole, or a combination thereof.

Also, the first nanoporous electrode 110 and the second nanoporous electrode 120 may further include a carbon material to increase an electrical conductivity, a surface area, and an ion affinity. The carbon material may include graphene, carbon nanotube (CNT), activated carbon, carbon aerogel, or a combination thereof. A content of the carbon material in each of the first and a porous the electrode and the second nanocrystal electrode may each independently be in a range of about 30 weight percent to about 95 weight percent, based on a total weight of the nanoporous electrode. The first nanoporous electrode 110 and the second nanoporous electrode 120 may include an electrolyte. The electrolyte may include an aqueous solution, an organic electrolyte, an ionic liquid, or a combination thereof.

The first nanoporous electrode 110 and the second nanoporous electrode 120 may be prepared by the following process.

The ion conductive polymer material used to prepare the first nanoporous electrode 110 and the second nanoporous electrode 120 may include, for example, Nafion or P(VDF-CTFE), and the carbon material may include carbon nanotube (CNT).

The first nanoporous electrode 110 may comprise a composite of Nafion and CNT in any suitable weight ratio, such as a weight ratio of 1:1. Also, the first nanoporous electrode 110 may be prepared by an infiltration method.

In order to prepare the first nanoporous electrode 110, first, a free-standing CNT film, which is also referred to as "buckypaper", is prepared. In order to prepare the free-standing CNT film, multiwall CNT powder is mixed with ethanol, and then the resultant is treated with a sonicator to form a homogenous dispersion of 0.2 milligrams per milliliter (mg/mL). Next, the dispersion is filtered through a hydrophobic PTFE filter having a pore size of about 0.2 micrometers (μm). Subsequently, the hydrophobic PTFE filter is dried at 80° C. for 1 hour, and then the free-standing CNT film may be peeled off from the filter. Then, in order to remove air trapped between nanotubes, the free-standing CNT film may be impregnated in a dimethylformamide (DMF)/Nafion solution having DMF as a solvent for several hours. Thereafter, the DMF solvent is evaporated. Since defects may occur when the DMF solvent is quickly evaporated, the DMF solvent may be slowly evaporated over about 3 days. After removing the DMF solvent, in order to increase the crystallinity of Nafion, the Nafion and CNT composite may be heat-treated at about 130° C. for about 1 hour. Through this process, the first nanoporous electrode 110 including Nafion and CNTs may be prepared.

The second nanoporous electrode 120 may be a P(VDF-CTFE) and CNT composite.

In order to prepare the second nanoporous electrode 120, first, CNT powder and P(VDF-CTFE) powder at a weight ratio of 3:7 are mixed in a solvent. Next, the mixture of the CNT powder and the P(VDF-CTFE) powder are treated using a sonicator for several hours to prepare a homogeneous solution. Then, the solution is vacuum filtered through a membrane filter having a pore size of about 0.02 82 m. Subsequently, after drying the membrane filter at 80° C. for several hours, a P(VDF-CTFE) and CNT composite having a thickness of about 50 μm may be peeled off from the membrane filter. Through the process, the second nanoporous electrode 120 including P(VDF-CTFE) and CNTs may be prepared.

The separation layer 150 may be between the first nanoporous electrode 110 and the second nanoporous electrode 120 to separate the first nanoporous electrode 110 and the second nanoporous electrode 120. When a current is generated as a force is applied to the energy harvesting device 100 from the outside, the separation layer 150 may prevent a leakage current between the first nanoporous electrode 110 and the second nanoporous electrode 120. The separation layer 150 may include glass microfibers, polypropylene, polyethylene, or a combination thereof.

The first current collector 130 and the second current collector 140 may be configured to be connected to the first nanoporous electrode 110 and the second nanoporous electrode 120, respectively. The first current collector 130 and the second current collector 140 may transfer a current generated from the first nanoporous electrode 110 and the second nanoporous electrode 120 to an electronic device and may include a metal material or a conductive carbon material. Also, the first current collector 130 and the second current collector 140 may include a metal foil or a metal mesh. Any suitable metal may be used. Aluminum and copper are mentioned.

The first metal plate 160 and the second metal plate 170 may be configured to be connected to the first current collector 130 and the second current collector 140, respectively. Also, the cylinder 180 may be configured to surround the first nanoporous electrode 110, the second nanoporous electrode 120, the first current collector 130, and the second current collector 140. When a force F is applied to the first metal plate 160 and the second metal plate 170 from the outside, the force F may be transferred to the first nanoporous electrode 110 and the second nanoporous electrode 120 through the first current collector 130 and the second current collector 140, and the first nanoporous electrode 110 and the second nanoporous electrode 120 may be expanded or contracted.

Figure 2A:
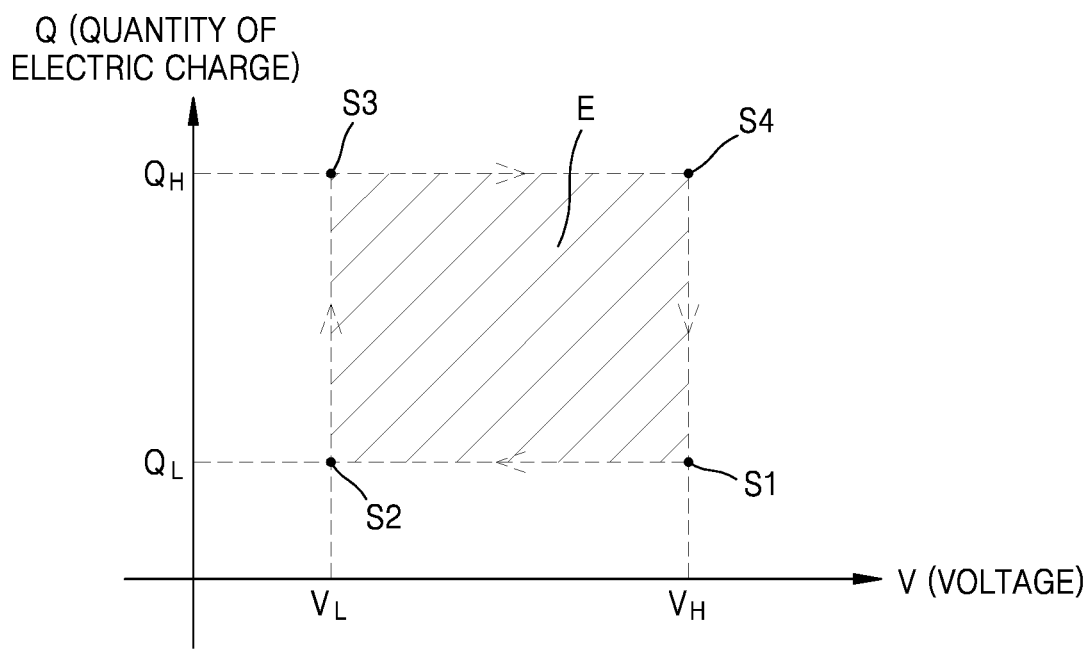
FIG. 2A is a graph of electric charge (arbitrary units) versus voltage (arbitrary units) and is a charge/voltage curve as an example of a VC energy harvesting cycle.
Figure 2B:
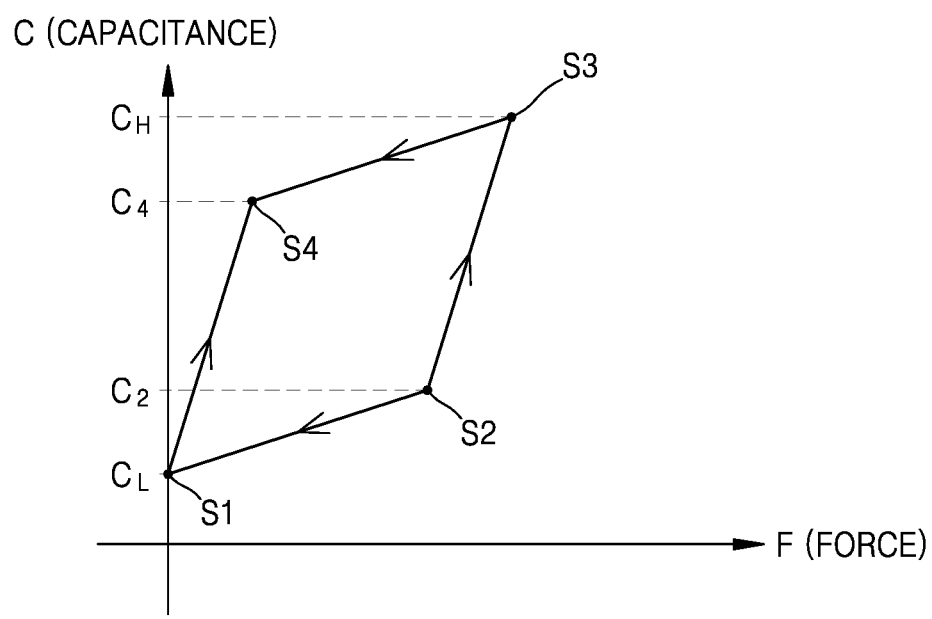
FIG. 2B is a graph of capacitance (arbitrary units) versus force (arbitrary units) and is a corresponding capacitance/force curve in the VC energy harvesting cycle of FIG. 2A.

FIG. 2A is a graph that illustrates a change in a quantity of electric charge depending on a voltage when a force F from the outside is applied to the energy harvesting device 100 according to an embodiment, and FIG. 2B is a graph that illustrates a change in a capacitance depending on a force F from the outside applied to the energy harvesting device 100 according to an embodiment.

Referring to FIGS. 2A and 2B, when two batteries (not shown) that provide a direct current (DC) bias voltage are connected to the energy harvesting device 100, the two batteries may each have a first voltage $V_H$ and a second voltage $V_L$, and the second voltage $V_L$ may have a lower value than that of the first voltage $V_H$.

At S1, the energy harvesting device 100 may have a first quantity of electric charge $Q_L$ and a first capacitance $C_L$ at the first voltage $V_H$. $Q_L = C_L * V_H$ may be satisfied due to a relation between a voltage, a quantity of electric charge, and a capacitance.

When a force F from the outside is applied to the energy harvesting device 100, the first nanoporous electrode 110 and the second nanoporous electrode 120 may be contracted, and a gap between the first current collector 130 and the second current collector 140 may decrease. Therefore, a capacitance of the energy harvesting device 100 may be increased from the first capacitance $C_L$ to a second capacitance $C_2$. Since a quantity of electric charge of the energy harvesting device 100 does not change, a voltage applied to the energy harvesting device 100 may be decreased from the first voltage $V_H$ to the second voltage $V_L$. That is, a process of the energy harvesting device 100 may proceed from S1 to S2. At S2, $C_2 = Q_L/V_L = C_L * V_H/V_L$ may be satisfied due to a relation between a voltage, a quantity of electric charge, and a capacitance.

An ion concentration of the first nanoporous electrode 110 and the second nanoporous electrode 120 may change due to the contraction, and a capacitance of the energy harvesting device 100 may increase to a third capacitance $C_H$. As a capacitance increases, the energy harvesting device 100 may be charged by the second voltage $V_L$. Thus, a quantity of electric charge of the energy harvesting device 100 may increase from the first quantity of electric charge $Q_L$ to the second quantity of electric charge $Q_H$, and a capacitance may increase from the second capacitance $C_2$ to the third capacitance $C_H$. That is, a process of the energy harvesting device 100 may proceed from S2 to S3. At S3, $Q_H = C_H * V_L$ may be satisfied due to a relation between a voltage, a quantity of electric charge, and a capacitance.

As the first nanoporous electrode 110 and the second nanoporous electrode 120 expand again after being contracted by the force F applied from the outside, a gap between the first current collector 130 and the second current collector 140 may increase. Thus, a capacitance of the energy harvesting device 100 may decrease from the third capacitance $C_H$ to a fourth capacitance $C_4$. Since a quantity of electric charge of the energy harvesting device 100 does not change, a voltage applied to the energy harvesting device 100 may increase from the second voltage $V_L$ to the first voltage $V_H$. That is, a process of the energy harvesting device 100 may proceed from S3 to S4. At S4, $C_4 = Q_H/V_H = C_H * V_L/V_H$ may be satisfied due to a relation between a voltage, a quantity of electric charge, and a capacitance.

At S4, as a capacitance of the energy harvesting device 100 continuously increases, a capacitance may decrease from the fourth capacitance $C_4$ to the first capacitance $C_L$. Since the first voltage $V_H$ does not change, a quantity of electric charge may decrease from the second quantity of electric charge $Q_H$ to the first quantity of electric charge $Q_L$. That is, a process of the energy harvesting device 100 may proceed from S4 to S1, and an electric output may be generated at the first voltage $V_H$. The output generated from the energy harvesting device 100 may charge a battery (not shown).

An energy E generated during one cycle of the energy harvesting device 100 that started from S1 and returned to S1 may have an area of the energy E shown in FIG. 2A, and the generated energy E may be the same as $(Q_H - Q_L)*(V_H - V_L) = (C_H*V_L - C_L*V_H)*(V_H - V_L)$. For example, when the third capacitance $C_H$ is about 50 Farads per cubic centimeter (F/cm$^3$), $C_L = 0.7 C_H$, the first voltage $V_H$ is 3V, and the second voltage $V_L$ is 2.65 V, energy generated during one cycle by the energy harvesting device 100 may be 28.8 Joules per cubic centimeter (J/cm$^3$).

Figure 3:
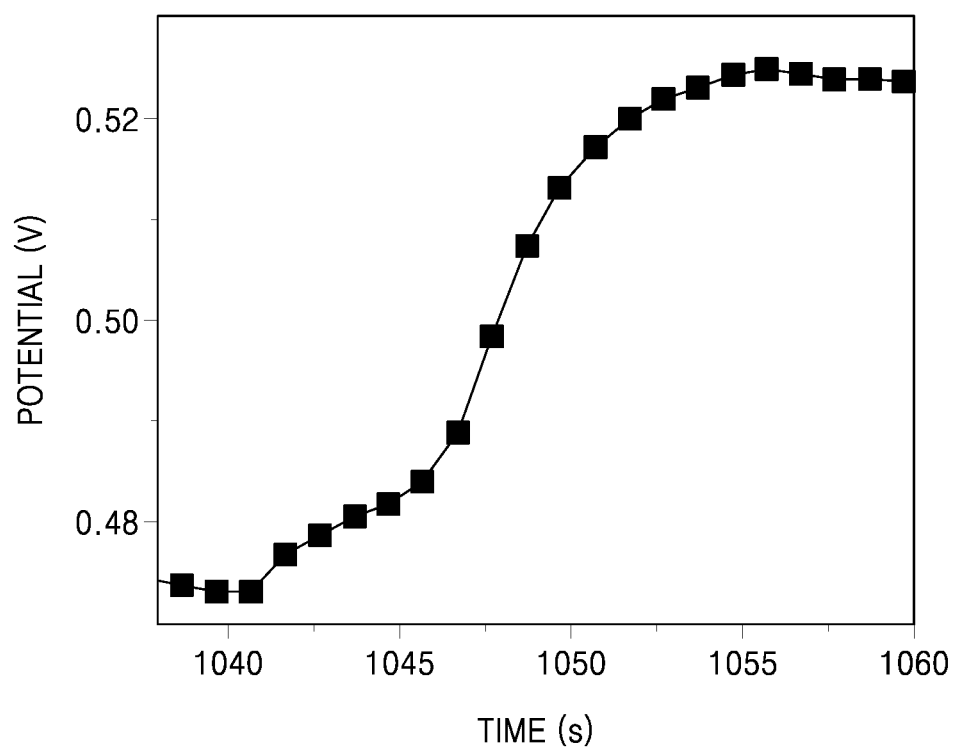
FIG. 3 is a graph of potential (volts) versus time (seconds) illustrating a change of open circuit potential with applying/releasing pressure to the energy harvesting device of FIG. 1.

FIG. 3 is a graph that illustrates a change in an open circuit potential depending on time when a force F is removed after the force F from the outside is applied to the energy harvesting device 100 according to an embodiment.

Referring to FIG. 3, when the force is removed after being applied from the outside, a potential difference of about 50 millivolts (mV) was measured. When the potential difference is $\Delta V$, and an initial charge density stored in the energy harvesting device 100 while the potential changes is Q, energy generated during one cycle by the energy harvesting device 100 may be calculated as $Q * \Delta V$. Therefore, the energy generated during one cycle by the energy harvesting device 100 may be calculated as 0.2 J/cm$^3$.

Figure 4:
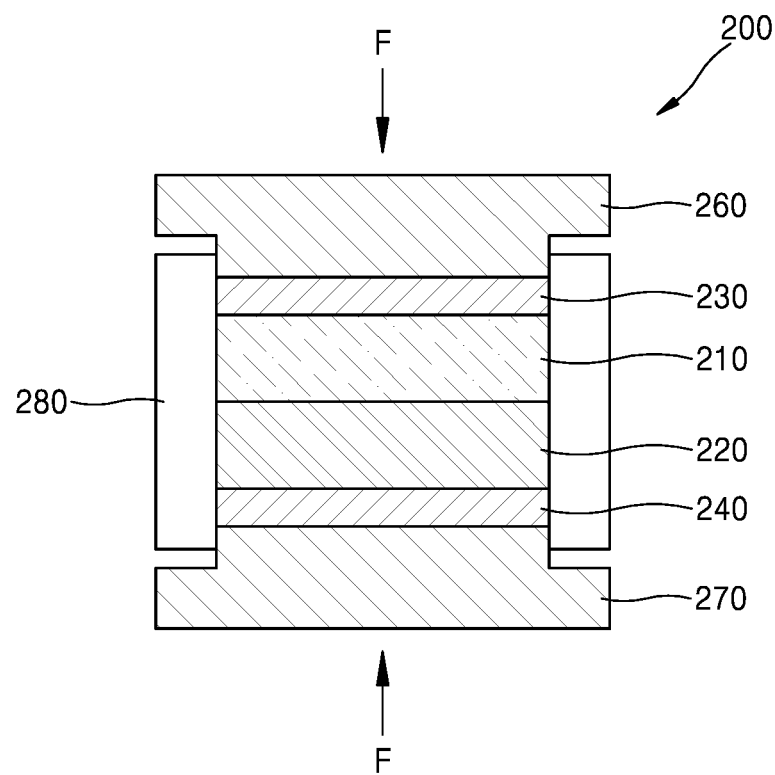
FIG. 4 is a cross-sectional view of an energy harvesting device according to another embodiment.

FIG. 4 is a cross-sectional view of an energy harvesting device 200 according to another embodiment.

Referring to FIG. 4, the energy harvesting device 200 may include a p-type nanoporous electrode 210, an n-type nanoporous electrode 220, a first current collector 230, a second current collector 240, a first metal plate 260, a second metal plate 270, and a cylinder 280.

The p-type nanoporous electrode 210 is an electrode that provides mobile cations, and may include Nafion, sulfonated poly(ether ether ketone) (SPEEK), sulfonated poly(arylene ether ketone ketone sulfone) (SPAEKKS), sulfonated poly (aryl ether ketone) (SPAEK), poly[bis(benzimidazobenzisoquinolinones)] (SPBIBI), poly(styrene sulfonic acid) (PSS), sodium 9,10-diphenylanthracene-2-sulfonate (DPAS$^-$Na$^+$), or a combination thereof. Also, the p-type nanoporous electrode 210 may include CNTs and agarose.

When agarose is added to the p-type nanoporous electrode 210 including Nafion, SPEEK, SPAEKKS, SPAEK, SPBIBI, PSS, DPAS$^-$Na$^+$, or a combination thereof and CNTs, the p-type nanoporous electrode 210 may be an electrode in the form of gel having elasticity. When a force is applied to the p-type nanoporous electrode 210 in the form of gel from the outside, a shape of the p-type nanoporous electrode 210 may change.

The n-type nanoporous electrode 220 is an electrode that provides mobile anions and may include poly(diallyl dimethylammonium chloride) (PDAC), quaternary ammonium polysulphone (QAPS), tris(2,4,6-trimethoxyphenyl) polysulfone methylene quaternary phosphonium hydroxide (TPQPOH), quaternized PVA(QAPVA), quaternized poly (ether imide) (QPEI), [Ru(bpy)$_3$]$^{2+}$ (PF$_6^{31}$)$_2$, or a combination thereof. Also, the n-type nanoporous electrode 220 may include CNTs and agarose.

When agarose is added to the -type nanoporous electrode 220 including PDAC, QAPS, TPQPOH, QAPVA, QPEI, $[Ru(bpy)_3]^{2+}$ $(PF_6^-)_2$, or a combination thereof and CNTs, the n-type nanoporous electrode 220 may be an electrode in the form of a gel having elasticity. When a force is applied to the n-type nanoporous electrode 220 in the form of gel from the outside, a shape of the n-type nanoporous electrode 220 may change.

The first current collector 230 and the second current collector 240 may be configured to be connected to the p-type nanoporous electrode 210 and the n-type nanoporous electrode 220, respectively. The first current collector 230 and the second current collector 240 may transfer a current generated from the p-type nanoporous electrode 210 and the n-type nanoporous electrode 220 to an electronic device and may include a metal material or a conductive carbon material. Also, the first current collector 230 and the second current collector 240 may include a metal foil or a metal mesh.

The first metal plate 260 and the second metal plate 270 may be configured to be connected to the first current collector 230 and the second current collector 240, respectively. Also, the cylinder 280 may be configured to surround the p-type nanoporous electrode 110, the n-type nanoporous electrode 120, the first current collector 230, and the second current collector 240. When a mechanical force F is applied to the first metal plate 260 and the second metal plate 270 from the outside, the force F may be transferred to the p-type nanoporous electrode 210 and the n-type nanoporous electrode 220 through the first current collector 230 and the second current collector 240, and the p-type nanoporous electrode 210 and the n-type nanoporous electrode 220 may be expanded or contracted.

Figure 5A:
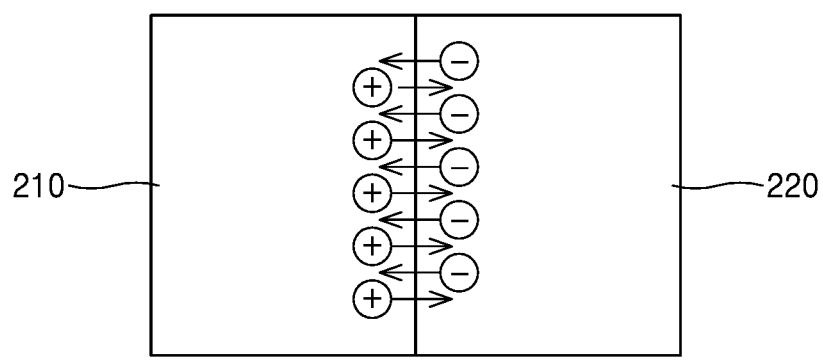
FIGS. 5A and 5B show cross-sectional views illustrating a process of forming a space charge region when a p-type nanoporous electrode and an n-type nanoporous electrode are fused in the energy harvesting device.
Figure 5B:
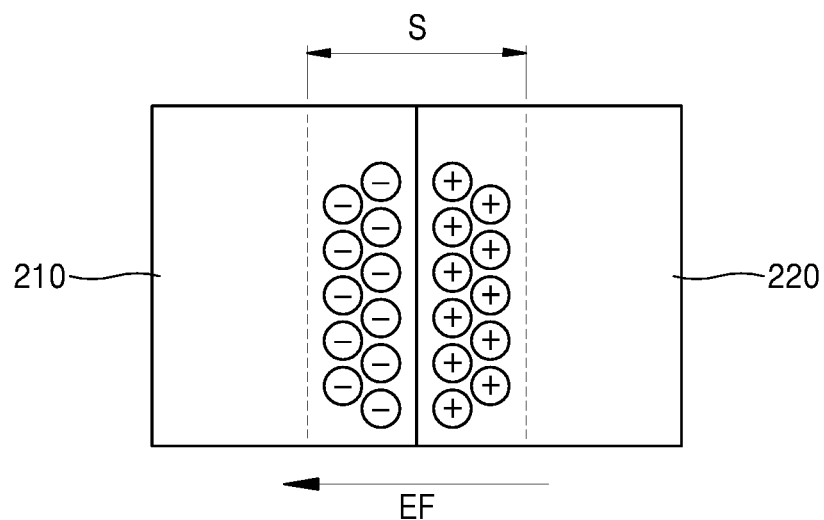

FIGS. 5A and 5B are cross-sectional views that illustrate a process of forming a space charge region S when the p-type nanoporous electrode 210 and the n-type nanoporous electrode 220 contact with each other in the energy harvesting device 200 according to another embodiment.

Referring to FIGS. 5A and 5B, when the p-type nanoporous electrode 210 and the n-type nanoporous electrode 220 contact each other, cations (+) may diffuse toward the n-type nanoporous electrode 220, and anions (−) may diffuse toward the p-type nanoporous electrode 210. Therefore, anions (−) may remain at the p-type nanoporous electrode 210, and cations (+) may remain at the n-type nanoporous electrode 220.

Next, the anions (−) that diffused to the p-type nanoporous electrode 210 may disappear as they meet and recombine with the cations at the p-type nanoporous electrode 210, and the cations (+) that diffused to the n-type nanoporous electrode 220 may disappear as they meet and recombine with the anions at the n-type nanoporous electrode 220. As a result, the cations (+) and the anions (−) that moved by diffusion disappear, and a space charge region S may be formed near an interface where no movable charge carrier is present. In the space charge region S, only charged ions may remain. In the space charge region S, ions with negative charges remain at a side of the p-type nanoporous electrode 210, and ions with positive charges remain at a side of the n-type nanoporous electrode 220. As a result, an electric field EF may be formed in a direction from the n-type nanoporous electrode 220 to the p-type nanoporous electrode 210. The electric field EF may suppress diffusion of the cations (+) and the anions (−).

Figure 5C:
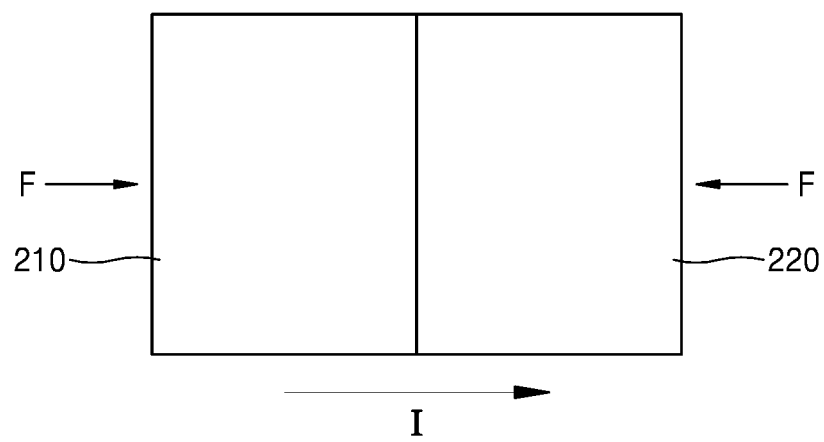
FIG. 5C is a cross-sectional view illustrating a flow direction of a current that is generated when force is applied to the energy harvesting device from the outside.

FIG. 5C is a cross-sectional view that illustrates a flow direction of a current I that is generated when a force F is applied to the energy harvesting device 200 according to another embodiment from the outside.

Referring to FIG. 5C, when a force F is applied to the p-type nanoporous electrode 210 and the n-type nanoporous electrode 220 from the outside, concentrations of cations and anions at the p-type nanoporous electrode 210 and the n-type nanoporous electrode 220 may change. The change in the concentrations of cations and anions may change a width of the space charge region S, and the change in the width may generate diffusion of the cations and anions in an opposite direction. Therefore, the current I may be generated by the diffusion of the cations and anions.

Since the force F applied to the p-type nanoporous electrode 210 and the n-type nanoporous electrode 220 is generated by movement of a human, mechanical energy by human movement may be used as a source of a mobile electronic device.

Figure 6:
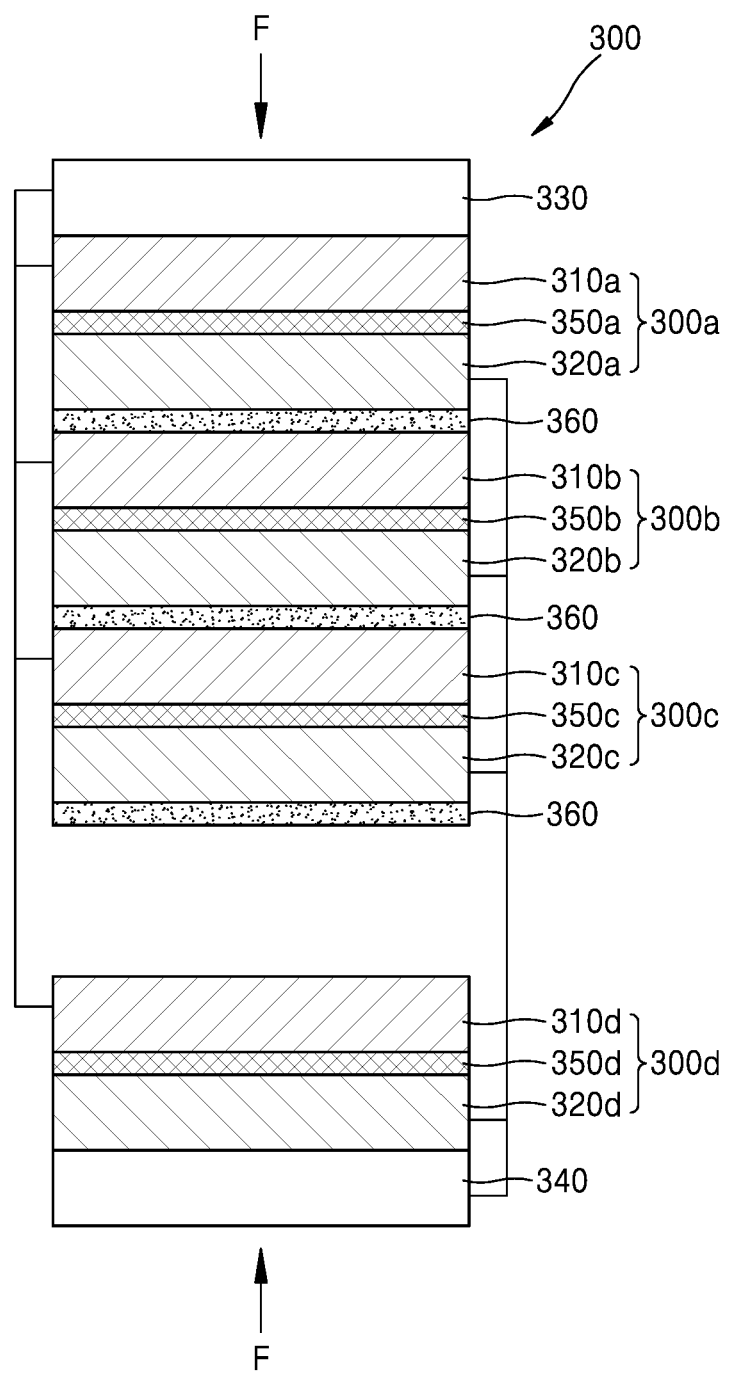
FIG. 6 is a cross-sectional view illustrating an energy harvesting device according to another embodiment.

FIG. 6 is a cross-sectional view of an energy harvesting device 300 according to another embodiment.

Referring to FIG. 6, the energy harvesting device 300 may include a plurality of energy harvesting units 300a, 300b, 300c, and 300d, a first current collector 330, and a second current collector 340.

The plurality of energy harvesting units 300a, 300b, 300c, and 300d may be stacked in a direction parallel to a direction of a force F applied from the outside.

The first energy harvesting unit 300a, the second energy harvesting unit 300b, the third energy harvesting unit 300c, and the fourth energy harvesting unit 300d may include p-type nanoporous electrodes 310a, 310b, 310c, and 310d, n-type nanoporous electrodes 320a, 320b, 320c, and 320d, and separation layers 350a, 350b, 350c, and 350d, respectively. The separation layers 350a, 350b, 350c, and 350d may be between the p-type nanoporous electrodes 310a, 310b, 310c, and 310d and the n-type nanoporous electrodes 320a, 320b, 320c, and 320d. The plurality of energy harvesting units 300a, 300b, 300c, and 300d may optionally include the separation layers 350a, 350b, 350c, and 350d, and the separation layers 350a, 350b, 350c, and 350d may be omitted. In this configuration, and an n-type nanoporous electrode of a first or upper energy harvesting unit may be proximate to a p-type nanoporous electrode of a second or lower energy harvesting unit, as shown in FIG. 6, for example.

The p-type nanoporous electrodes 310a, 310b, 310c, and 310d and the n-type nanoporous electrodes 320a, 320b, 320c, and 320d may be the same as the p-type nanoporous electrode 210 and the n-type nanoporous electrodes 220 described in FIG. 3.

An ion blocking layer 360 may be between the plurality of energy harvesting units 300a, 300b, 300c, and 300d to prevent ions generated from each of the energy harvesting units 300a, 300b, 300c, and 300d from entering another energy harvesting unit.

The first current collector 330 may be connected to a plurality of the p-type nanoporous electrodes 310a, 310b, 310c, and 310d, and the second current collector 340 may be connected to a plurality of the n-type nanoporous electrodes 320a, 320b, 320c, and 320d. The first current collector 330 and the second current collector 340 may be the same as the first current collector 230 and the second current collector 240 described in FIG. 3.

When a force is applied to the energy harvesting device 300, the plurality of the p-type nanoporous electrodes 310a, 310b, 310c, and 310d and the plurality of the n-type nanoporous electrodes 320a, 320b, 320c, and 320d may be contracted. Thus, a current may be generated through the process described in FIGS. 5A to 5C. Since the energy harvesting device 300 includes the plurality of energy harvesting units 300a, 300b, 300c, and 300d, a large amount of current may be generated from the energy harvesting device 300, compared to that including a single energy harvesting unit.

As described above, according to one or more of the above embodiments, an energy harvesting device may be used in a mobile electronic device as a power source that uses mechanical energy of human movement, which otherwise would remain uncaptured. Therefore, the energy harvesting device may increase a lifespan of a battery or be an alternative to the battery.

It should be understood that exemplary embodiments described herein should be considered in a descriptive sense only and not for purposes of limitation. Descriptions of features, aspects, or advantages within each exemplary embodiment should be considered as available for other similar features, aspects, or advantages in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An energy harvesting device comprising:
a first nanoporous electrode and a second nanoporous electrode, each of which is configured to store electrical charge;
a first current collector connected to the first nanoporous electrode and a second current collector connected to the second nanoporous electrode; and
an enclosure that contains the first and second nanoporous electrodes and the first and second current collectors and is configured to transfer an externally applied mechanical force to the first nanoporous electrode and the second nanoporous electrode,
wherein at least one of the first nanoporous electrode and the second nanoporous electrode comprises an ion conductive polymer,
wherein the enclosure comprises
a first metal plate disposed on and connected to the first current collector, and
a second metal plate disposed on and connected to the second current collector,
wherein a capacitance of the first nanoporous electrode and the second nanoporous electrode changes and a gap between the first nanoporous electrode and the second nanoporous electrode decreases and increases, respectively, as the externally applied mechanical force contracts and expands the first nanoporous electrode and the second nanoporous electrode.

2. The energy harvesting device of claim 1, wherein the enclosure further comprises
a cylinder that is configured to surround the first nanoporous electrode, the second nanoporous electrode, the first current collector, and the second current collector.

3. The energy harvesting device of claim 1, wherein the first metal plate and the second metal plate are configured to transfer the mechanical force to the first nanoporous electrode and the second nanoporous electrode.

4. The energy harvesting device of claim 1, wherein at least one of the first nanoporous electrode and the second nanoporous electrode comprises a carbonaceous material, an ion conductive polymer, or a combination thereof.

5. The energy harvesting device of claim 4, wherein the carbonaceous material comprises graphene, carbon nanotube, activated carbon, carbon aerogel, or a combination thereof.

6. The energy harvesting device of claim 4, wherein the ion conductive polymer comprises polytetrafluoroethylene, Nafion, poly(vinylidene fluorodichlorotrifluoroethylene), poly(vinylidene fluoride-trifluoroethylene-chlorofluoroethylene), poly(3,4-ethylenedioxythiophene), polyaniline, polypyrrole, or a combination thereof.

7. The energy harvesting device of claim 4, wherein a content of the carbonaceous material in each of the first nanoporous electrode and the second nanoporous electrode is independently in a range of about 30 weight percent to about 95 weight percent, based on a total weight of the nanoporous electrode.

8. The energy harvesting device of claim 1 further comprising a separation layer that separates the first nanoporous electrode and the second nanoporous electrode.

9. The energy harvesting device of claim 1, wherein the first nanoporous electrode and the second nanoporous electrode comprise an electrolyte.

10. The energy harvesting device of claim 9, wherein the electrolyte comprises an aqueous solution, an organic electrolyte, an ionic liquid, or a combination thereof.

11. An energy harvesting device comprising:
a p-type nanoporous electrode that provides mobile cations and an n-type nanoporous electrode that provides mobile anions;
a first current collector that is connected to the p-type nanoporous electrode and a second current collector that is connected to the n-type nanoporous electrode; and
an enclosure that contains the p-type and n-type nanoporous electrodes and the first and second current collectors and is configured to transfer an externally applied mechanical force to the p-type nanoporous electrode and the n-type nanoporous electrode,
wherein the enclosure comprises
a first metal plate disposed on and connected to the first current collector, and
a second metal plate disposed on and connected to the second current collector,
wherein a width of a space charge region between the p-type nanoporous electrode and the n-type nanoporous electrode decreases and increases as the externally applied mechanical force contracts and expands the p-type nanoporous electrode and the n-type nanoporous electrode.

12. The energy harvesting device of claim 11, wherein the enclosure further comprises:
a cylinder that is configured to surround the p-type nanoporous electrode, the n-type nanoporous electrode, the first current collector, and the second current collector.

13. The energy harvesting device of claim 11, wherein the first metal plate and the second metal plate are configured to transfer the mechanical force to the p-type nanoporous electrode and the n-type nanoporous electrode.

14. The energy harvesting device of claim 11, wherein the p-type nanoporous electrode comprises Nafion, sulfonated poly(ether ketone), sulfonated poly(arylene ether ketone sulfone), sulfonated poly(aryl ether ketone), poly [bis(benzimidazobenzisoquinolinones)], poly(styrene sulfonic acid), sodium 9, 10-diphenylanthracene-2-sulfonate, or combination thereof.

15. The energy harvesting device of claim 14, wherein the p-type nanoporous electrode comprises carbon nanotube and agarose.

16. The energy harvesting device of claim 14, wherein the n-type nanoporous electrode comprises poly(diallyl dimethylammonium chloride), quaternary ammonium polysulphone, tris(2,4,6-trimethoxyphenyl) polysulfone methylene quaternary phosphonium hydroxide, quaternized polyvinyl alcohol, quaternized poly(ether imide), $[Ru(bpy)_3]^{2+}(PF_6^-)_2$, or a combination thereof.

17. The energy harvesting device of claim 16, wherein the n-type nanoporous electrode comprises carbon nanotube and agarose.

18. An energy harvesting device comprising:
- a first energy harvesting unit that comprises:
  - a first p-type nanoporous electrode that provides mobile cations;
  - a first n-type nanoporous electrode that provides mobile anions; and
  - a first separation layer that separates the first p-type nanoporous electrode and the first n-type nanoporous electrode;
- a second energy harvesting unit that comprises:
  - a second p-type nanoporous electrode that provides mobile cations;
  - a second n-type nanoporous electrode that provides mobile anions; and
  - a second separation layer that separates the second p-type nanoporous electrode and the second n-type nanoporous electrode;
- a first current collector that is connected to the first p-type nanoporous electrode and the second p-type nanoporous electrode;
- a second current collector that is connected to the first n-type nanoporous electrode and the second n-type nanoporous electrode; and
- an ion blocking layer between the first energy harvesting unit and the second energy harvesting unit,
- wherein the ion blocking layer is in direct contact with the first p-type nanoporous electrode and the second n-type nanoporous electrode or in direct contact with the first n-type nanoporous electrode and the second p-type nanoporous electrode, and
- wherein the first energy harvesting unit is disposed on the second energy harvesting unit, and wherein the first n-type nanoporous electrode of the first energy harvesting unit is proximate the second p-type nanoporous electrode of the second energy harvesting unit.

* * * * *